US007927214B2

(12) United States Patent
Yates, Jr. et al.

(10) Patent No.: US 7,927,214 B2
(45) Date of Patent: Apr. 19, 2011

(54) TRANSFER OF CONTENT TO CLOSED SYSTEMS

(75) Inventors: Ronnie Donnell Yates, Jr., Bothell, WA (US); Richard Andrew Meyer, Redmond, WA (US); Aaron Joshua Nonis, Duvall, WA (US); Stephen J. Styrchak, Kirkland, WA (US); Julien Jacques Nicolas Ellie, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1153 days.

(21) Appl. No.: 11/636,219

(22) Filed: Dec. 8, 2006

(65) Prior Publication Data

US 2008/0140845 A1 Jun. 12, 2008

(51) Int. Cl.
*G06F 17/00* (2006.01)
(52) U.S. Cl. ......................................................... 463/29
(58) Field of Classification Search ................... 463/29; 705/80; 713/172
See application file for complete search history.

(56) References Cited

U.S. PATENT DOCUMENTS

| 7,206,941 | B2 * | 4/2007 | Raley et al. | 713/193 |
| 7,237,125 | B2 * | 6/2007 | Raley et al. | 713/193 |
| 2001/0032312 | A1 * | 10/2001 | Runje et al. | 713/172 |
| 2003/0204753 | A1 * | 10/2003 | Raley et al. | 713/201 |
| 2005/0278793 | A1 * | 12/2005 | Raley et al. | 726/28 |
| 2009/0158145 | A1 * | 6/2009 | Schering | 715/275 |

FOREIGN PATENT DOCUMENTS

| EP | 0709772 | 9/2000 |
| KR | 0076846 | 10/2002 |
| TW | 524705 | 3/2003 |
| WO | WO 2006/055840 | 5/2006 |

* cited by examiner

*Primary Examiner* — Ronald Laneau
(74) *Attorney, Agent, or Firm* — Woodcock Washburn LLP (57) ABSTRACT

Mechanisms are disclosed that allow for the communication between closed computing systems and other computing systems. Gaming consoles, for instance, can use the present mechanisms to communicate with PCs, especially when unsigned content is sent from the PCs to the gaming consoles. The disclosed communication mechanism can have multiple channels to send information (which may include code and/or data associated with the unsigned content) from the PCs to the gaming consoles. Such information may be distributed over several channels on the communication mechanism. For instance, the communication mechanism can first send a subset of a set of information from a computing system to a closed computing system. Then, depending on the closed system resources, the remaining set of information can be sent to the closed system. Various heuristics can be used to make a determination of whether to send the set of information following the sent subset of information, including but not limited to, GPU resources, memory resources, and the like.

20 Claims, 10 Drawing Sheets

TRANSFER OF CONTENT TO CLOSED SYSTEMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

TECHNOLOGY FIELD

The present technology relates to the field of computing, and more particularly, to gaming environments.

BACKGROUND

Gaming systems are prevalent in today's computing environments. Game consoles are typically closed systems that only allow signed games controlled by hardware vendors to execute on such consoles. This restriction may be done for various reasons, whether to preserve the business model of having a tightly controlled environment for publishers, where piracy of intellectual property is kept to a minimum, or controlling the types games that can be played on a gaming system—for instance, to only allow the playing of content that meets parental expectations for children. Additionally, limiting content to signed code can help to control and mitigate the potential for cheating on games in an online community, where certain assumptions, such as community scores or digital currencies, are essential to be accurate.

However, these tight restrictions present on game consoles prevent the larger creative community as a whole from developing games or game-like applications on closed game consoles. Thus, it is important to address the need of allowing developers, garners, general hobbyist, and student game developer communities, among others, to write games for a traditionally closed system on their own computing devices, and then providing the ability to send any gaming content to the closed devices via some transport or communication mechanism.

SUMMARY

Mechanisms are provided herein that allow for the communication between closed computing systems and other computing systems. For example, a gaming console can use the present mechanisms to communicate with a PC, when unsigned content is sent from the PC to the gaming console. In one aspect of the present disclosure, a communication mechanism can have multiple channels to send information, which may include code and/or data associated with the unsigned content, from the PC to the gaming console. Such information may be distributed over several channels on the communication mechanism.

In one exemplary and non-limiting aspect, the communication mechanism can first send a subset of a set of information from the computing system to the closed computing system. Then, depending on the closed system resources, the remaining set of information can be sent to the closed system. Various heuristics can be used to make a determination of whether to send the set of information following the sent subset of information, including but not limited to, GPU resources, memory resources, and the like.

It should be noted, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the presently disclosed subject matter, various aspects of the disclosure are shown. However, the disclosure is not limited to the specific aspects discussed. The following figures are included.

DETAILED DESCRIPTION

Overview

Gaming consoles are closed by default and do not allow for the transfer of unsigned code from remote destinations. Thus, a secure network layer is disclosed herein that allows for communication between a closed console and a remote computing device (e.g. a PC). Such communication may be between open computing devices and closed computing devices, or between closed devices, depending on the implementation. Additionally, the secure network layer is also structured in such a way as to allow for additional services such as debugging, performance monitoring, and profiling.

Since the security of the transport layer is important, in one general aspect of the presently disclosed subject matter, the following security features are provided: finding and establishing a secure connection between a PC and a gaming console; authenticating a secure connection between a user on the PC and the gaming console; and, securing data passed between the PC and the gaming console. With these security features in place, the transport of unsigned code and data can be managed between a closed computing device, such as a retail gaming console, and an open computing device, such as a PC.

For security purposes specifically, a closed device of this nature can have the capacity to generate cryptographically random data. It can have a device unique secret, such as a globally unique identifier (GUID), embedded within the system itself, and it can have the ability to encrypt/decrypt data as part of accessing system memory. The ability to generate cryptographically random data can be a prerequisite to the creation of secure encryption keys used elsewhere in the system. A device unique secret can be used to protect data within the system by creating a data signature using that secret, or encrypting using a unique seed.

Users can code unsigned games on their PC, and then transfer this information to a gaming console, where such games can be played. This aspect provides for transportation means for information to flow between PCs and gaming consoles (either one way or both ways, depending on the implementation). Such information flow can entail games being transferred from a PC to a gaming console, the synchronization of information between PCs and gaming consoles, or the live streaming of information from PCs to gaming consoles.

Aspects of Unsigned Content in a Closed System

In order to provide context for the present disclosure, this section focuses on the execution of unsigned content in a closed system in such a way that such execution is secure (i.e. such that resources in the closed system are protected). In order to gain a better appreciation for these aspects, it is instructive to compare them to the prior art.

Figure 1:
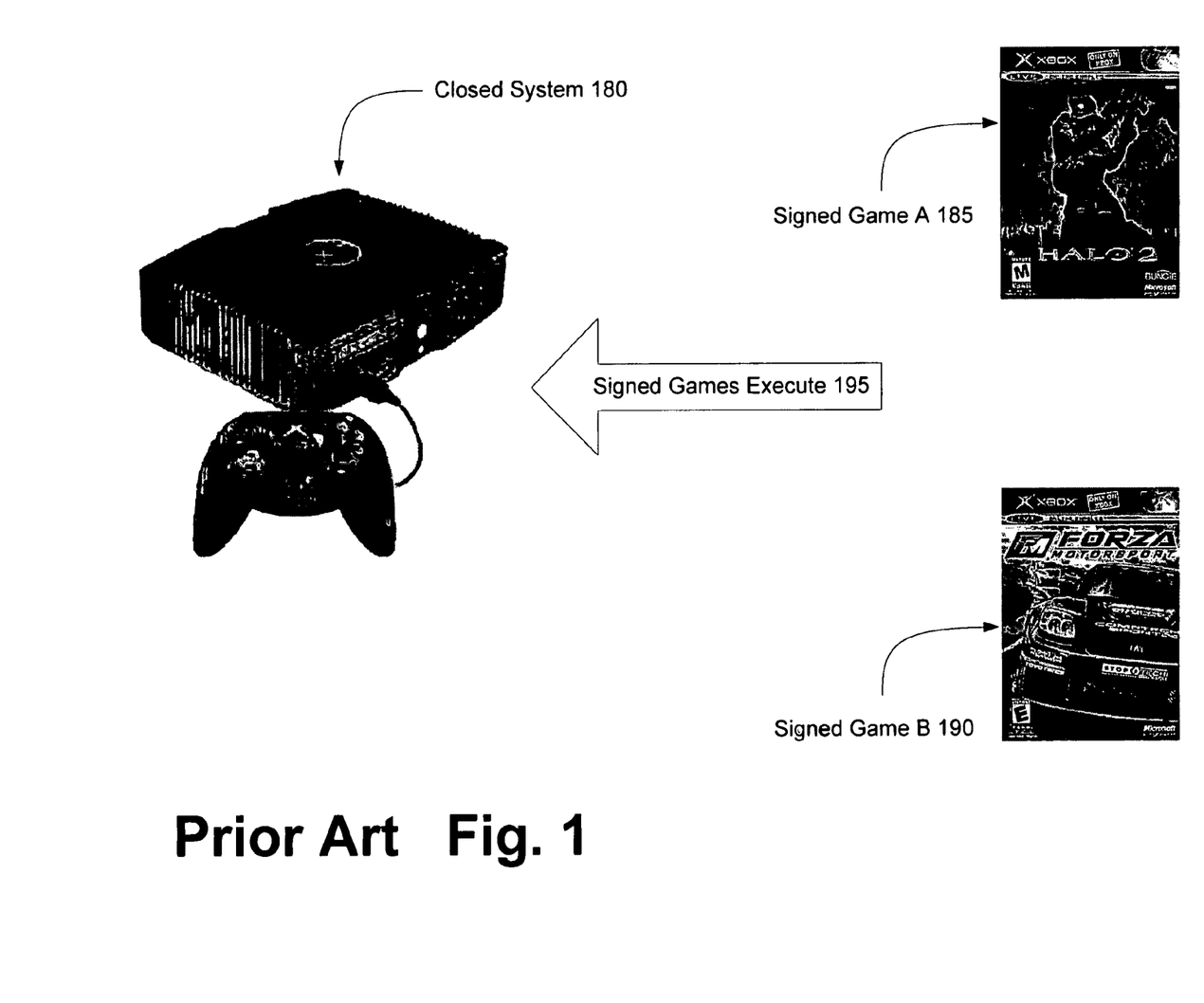
FIG. 1 illustrates a prior art system where only signed software components, namely, signed games, are able to run on a typically closed system.

Thus, FIG. 1 illustrates a prior art system where only signed software components, namely, signed games, are able to run on a typically closed system. Specifically, a closed system 180 is depicted against which various signed games, such as game A 185 and game B 190, are able to execute 195. These games 185, 190 are typically authorized by the closed system 180 manufacturer. However, in some aspects, they can be authorized by game developers or some other third parties. In any case, the system 180 is deemed "closed" in the sense that not every software program or application can run on it, as otherwise might be the case with a general purpose personal computer (a PC).

A typical signing process is well known in the art, and as was mentioned above, it serves a variety of purposes, such as limiting pirating of intellectual property and controlling who has access to the appropriate content. However, despite the numerous advantages of such a closed system 180, at times it unnecessarily restricts development of other "unsigned" games (games not officially authorized or sanctioned by a gaming authority). Such unsigned games can be games that are build on top of existing games (even "signed" games, if permission is obtained from a publisher of such signed games) or they may be newly developed games that could not otherwise run on a closed system.

Figure 2:
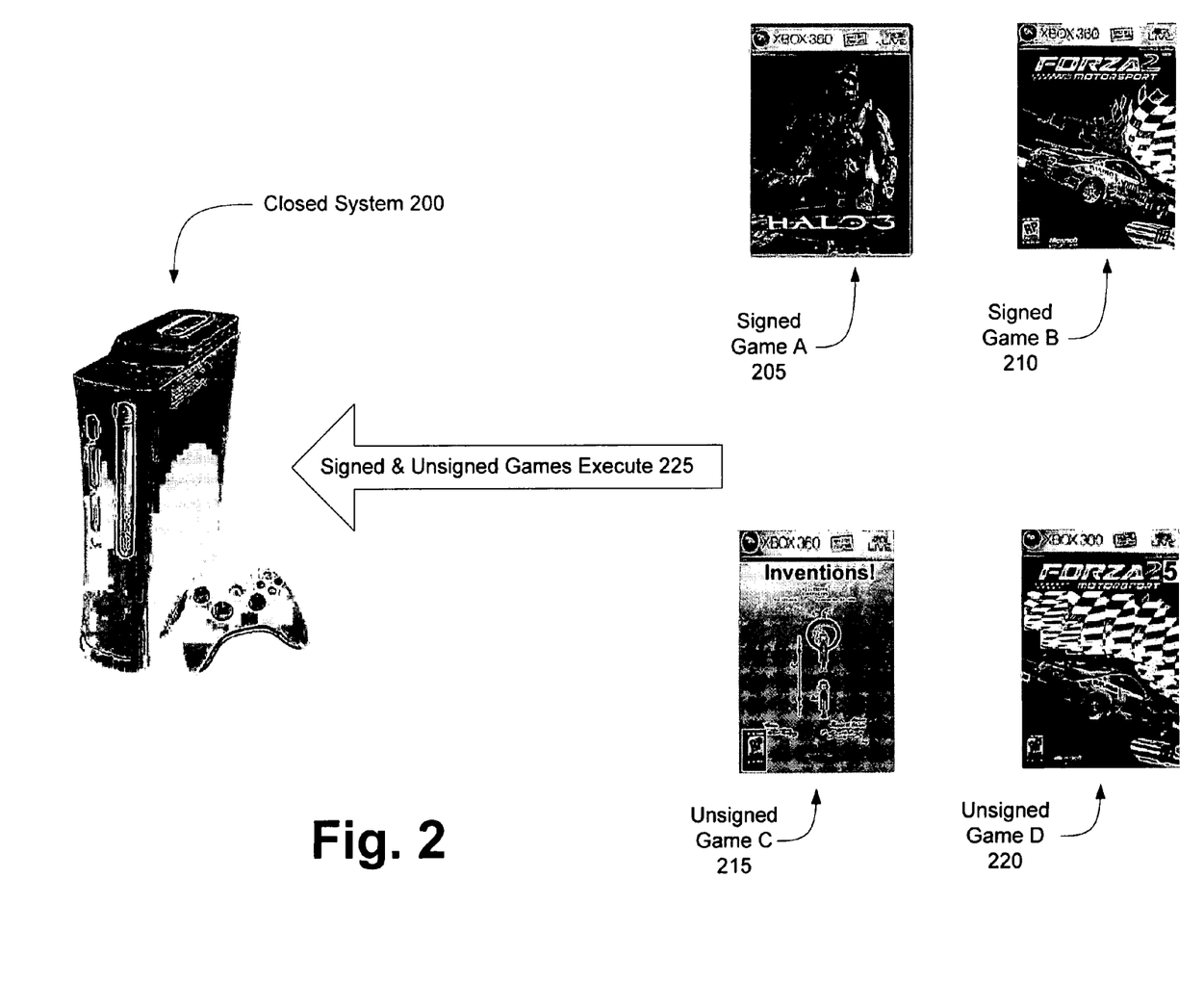
FIG. 2 illustrates a system where both signed and unsigned games are able to run on a closed system.

Thus, in contrast to FIG. 1, FIG. 2. illustrates a system where both signed and unsigned games are able to run on a closed system. A different closed system 200 vis-à-vis the closed system of FIG. 1, closed system 180, can run not only signed games A 205 and B 210, but also unsigned games C 215 and D 220. Although it should be noted, that the depicted closed systems 180 and 200 are merely exemplary and are not limited to any particular manufacturer or generation of computing device (abstract boxes for such system could have been shown instead of the concrete depictions in FIGS. 1 and 2). Thus, the illustrated systems 180 and 200 are merely exemplary and not limiting.

As was mentioned above, allowing unsigned gaming content C 215 and D 220 to run on a system 200 that typically does not allow unsigned content to run, expands gaming capabilities of such a system 200. However, allowance of running unsigned gaming content 215, 220 also presents security problems. Since games C 215 and D 220 are unsigned, i.e. they are not verified to be what they purport to be, malicious or undesired code and data can end up running on the gaming system 220. Thus, a security layer can be present to address this problem. And, moreover, this security layer can not only allow unsigned games to run in the first place, but also additionally it can have the benefit of preventing undesired code and data from interacting with gaming system 200 resources.

Figure 3:
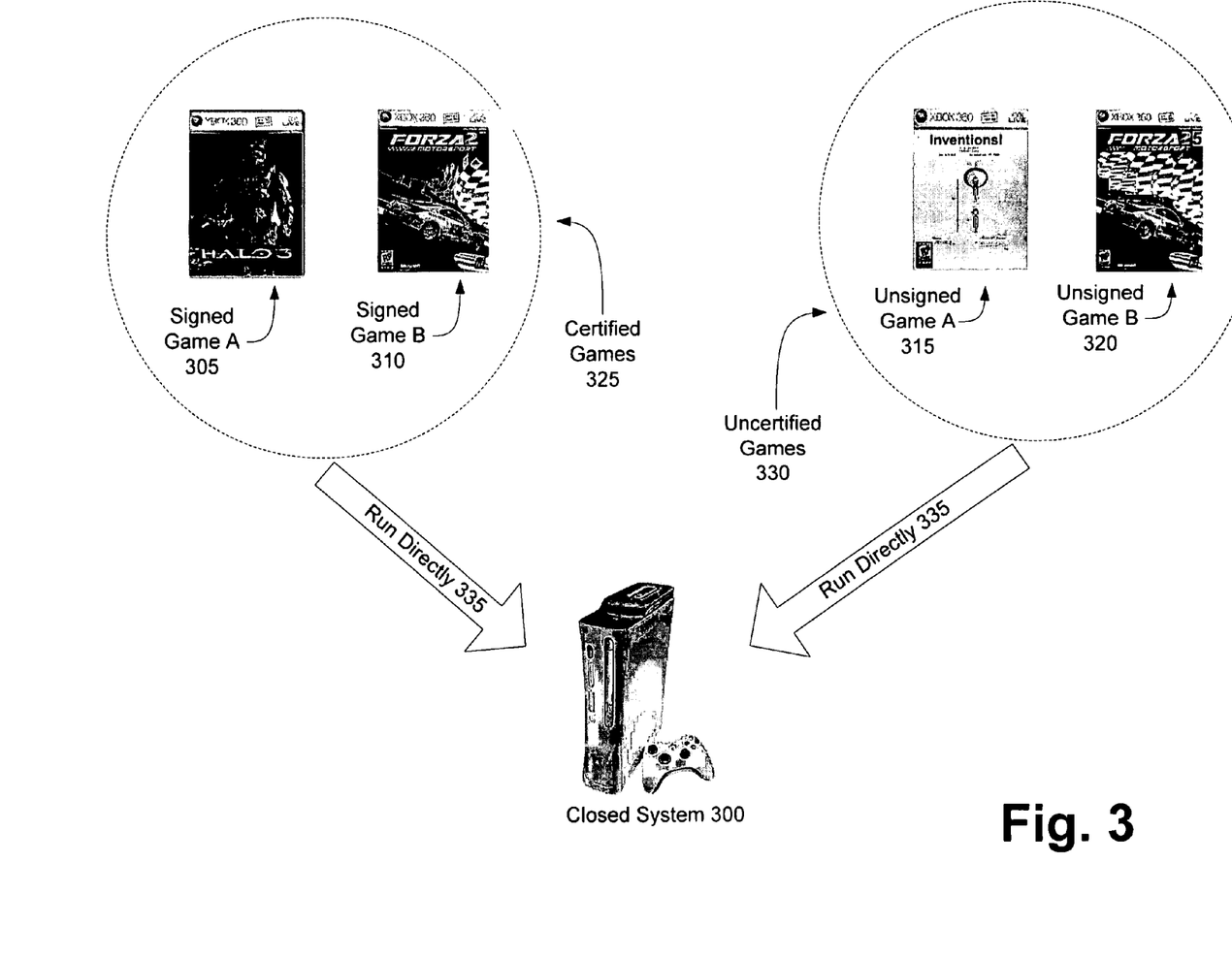
FIG. 3 illustrates that signed games are certified, and that unsigned games are not certified.

Next, FIG. 3 illustrates that signed games are certified, and that unsigned games are not certified. Specifically, games A 305 and B 310 are signed by some authentication or validation authority so that these games can run 335 on a specified closed system designated by the authority. Such signed games A 305 and B 310 are said to be certified 325. In contrast, uncertified games 330 are games that are not signed off by some such authority, namely, games A 315 and B 320, and so typically they cannot execute on the closed system 300. Given some implementation of the above and below aspects of the present disclosure, such games 315, 320 can run on the closed system 300 (in addition to the originally signed games A 305 and B 310).

Figure 4:
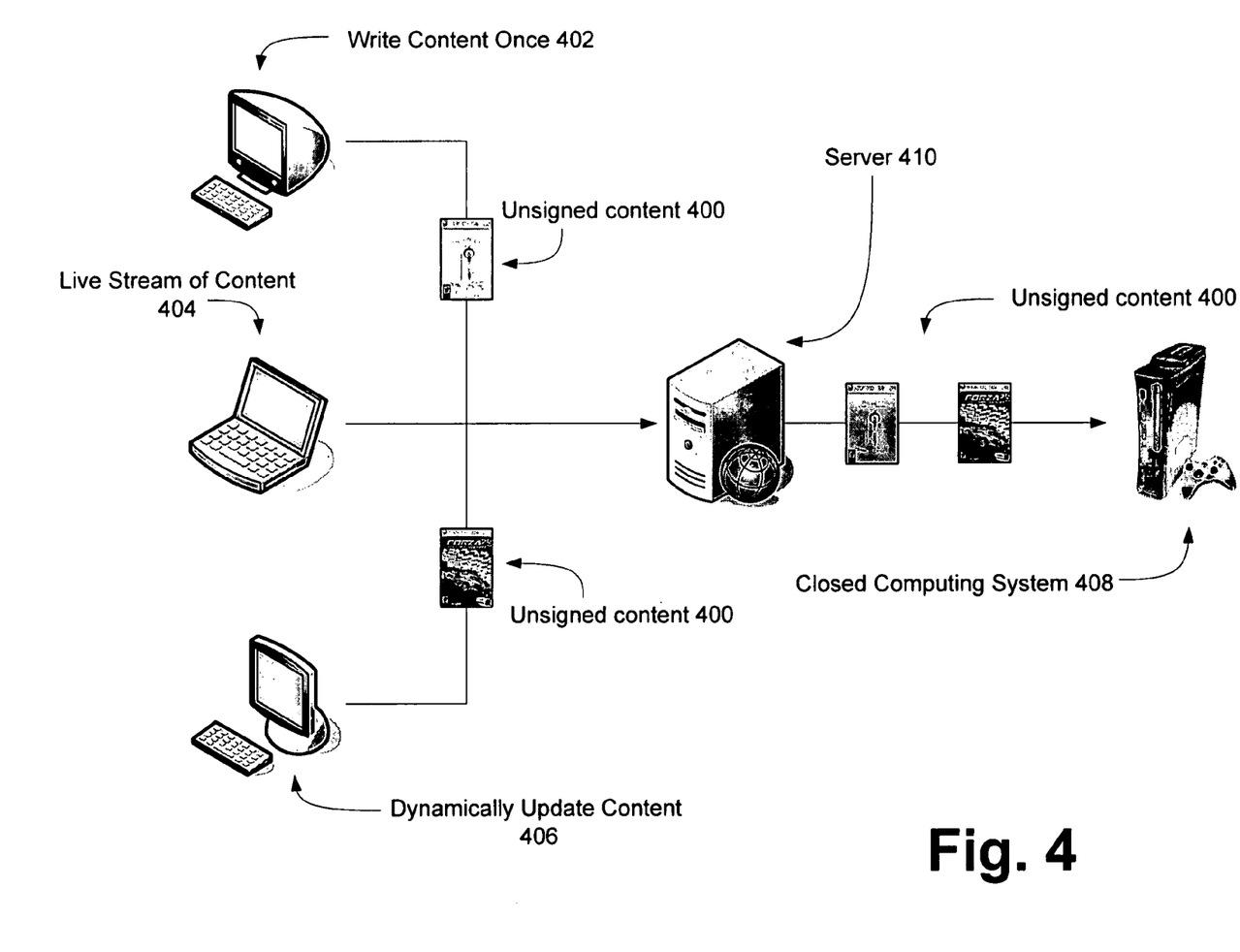
FIG. 4 illustrates that there is a myriad of ways in which unsigned content can be provided from some computing source to a closed system.

Lastly, there is a myriad of ways in which unsigned content can be provided from some computing system, device, or source to a closed system, device, or target, as is shown in FIG. 4. The types of content contemplated in this aspect can include content that is provided only once 402 via a communication mechanism associated with the closed computing system 408 (discussed in detail with reference to FIGS. 6-8), content that is streamed 404 to the system 406 via the communication mechanism, or content that is periodically and dynamically 408 provided to the system 408 via the communication mechanism.

Various types of content providing architectures are contemplated herein. One type may have an intervening server 410 between the computing sources 402, 404, 406 and the closed system 408, while other types may have direct connection between a computing source and the closed system 408 (e.g. shown in FIG. 6). The manner in which information is received, stored, and passed down to the system 408 can depend on the restrictions placed by system 408 manufacturers in the transport or communication layer associated with the communication mechanism. Thus, a transport layer can have various communication policy decisions for any given communication mechanism, such as a multi-channel transport mechanism discussed in detail in the below description and the corresponding FIGS. 5-8.

Aspects of a Transfer Mechanism Between Closed Systems and Computing Devices

Figure 5:
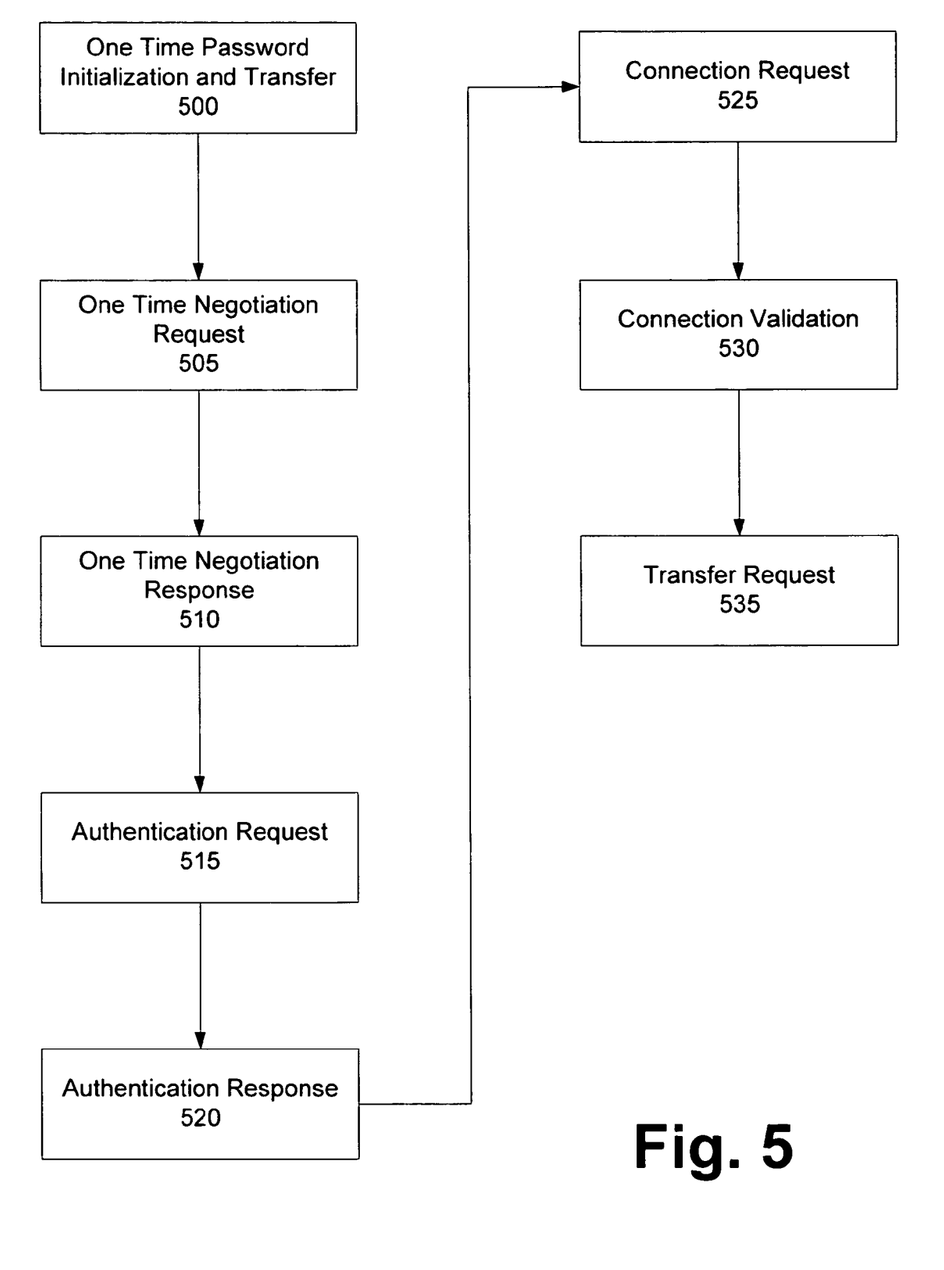
FIG. 5 illustrates one exemplary and non-limiting method for establishing communication between the closed system and the computing source.

There may be various steps for establishing and transferring content from a computing device to a closed computing device. In an exemplary and non-limiting aspect of the present disclosure, FIG. 5 illustrates in block diagram form how a typical connection can be established between such devices (or systems if implemented on a wider scale). At block 500, a one time password (OTP) initialization and transfer process is implemented. Before an OTP is generated, a user can be authenticated to the device by some means, as those of skill in the art will readily appreciate. Using the aforementioned closed device secret as the basis for symmetric encryption, an encrypted memory area can be created. Using the closed device's cryptographically random data generator, a symmetric key can be produced within that protected memory area. The OTP can be encoded and presented to the user for manual entry into the open device to be allowed to connect and transfer data.

The OTP can also be saved within the closed device, using the closed device secret as the basis for symmetrically encrypting the data and signing the data, thus preventing recovery of or tampering with the OTP stored within the closed device without first compromising the closed device secret. This encrypted and signed OTP storage can be referred to as the "key vault." On the open device, the OTP can be stored within any user-specific storage area.

Next, at block 505, a one time negotiation request can be made. Given that the OTP can be manually transferred to the open computing device (e.g. PC), that open computing device can then create a handshake request to be broadcast on the local network at a known port. This handshake request can be symmetrically encrypted with the OTP, and can be readable only by the closed device that generated the OTP.

The closed device can then be put into a listening state in order for it to accept requests from the network. Upon a user requesting the closed device to listen, the key vault can be inspected for an OTP, and if it exists the closed device waits for a message encrypted with that OTP. Upon the receipt of such a request, the closed device can generate an asymmetric key pair (an "Auth Key"), save the private key to the key vault, and discard the OTP.

Following this process, next, at block 510 a one time negotiation response can be made. The closed device can respond by broadcasting on the local network with the public Auth Key, encrypted with the OTP. This response can be read by the open computing device that generated the OTP, and the public Auth Key can be saved for future sessions.

Then, at block 515, an authentication request can be made. With the open device now assigned a unique Auth Key, a connection request can be issued on the local network to a known port, containing a session key (all encrypted with the public Auth Key). When the closed device enters a listening state at the request of the user, the key vault can be inspected, and if an Auth Key is found, rather than an OTP, it can listen for authentication requests only. Only the closed computing device that generated the Auth Key can correctly decipher an authentication request for that closed device.

Following this step, at block 520, an authentication response is made. Once an authentication request (at block 515) is received, the closed device can send an acknowledgment broadcast containing TCP/IP connection information, encrypted with the session key present in the request. Once the open computing device receives this acknowledgement, it knows it can connect to the closed device.

Once the authentication request (block 515) and authentication response (block 520) have been processed, at block 525, a connection request can be made. With the session key established on both sides, the open computing system can initiate a TCP request to the IP\port that was provided as part of the authentication response. Upon establishing a connection with the closed system, the open system can send a nonce encrypted with the session key to validate the connection.

At block 530, following the connection request (block 525), a connection validation is made. Upon an incoming connection to the closed computing device, it listens for the first datagram to come through. Upon receipt, and validation of the nonce, an acknowledgement is sent to the initiating system, again encrypted with the session key. Finally, at block 535, a transfer request is made. With the open device authenticated to the closed device, and a session key transferred, all further traffic is encoded into a stream and transferred in encrypted form. When the console receives a specific encoded request, it initializes a container file that and streams the transferred data into the storage file. That file is then signed using the closed device secret to ensure integrity of the data.

Aspects of a Transfer Mechanism Between Closed Systems and Computing Devices

Figure 6:
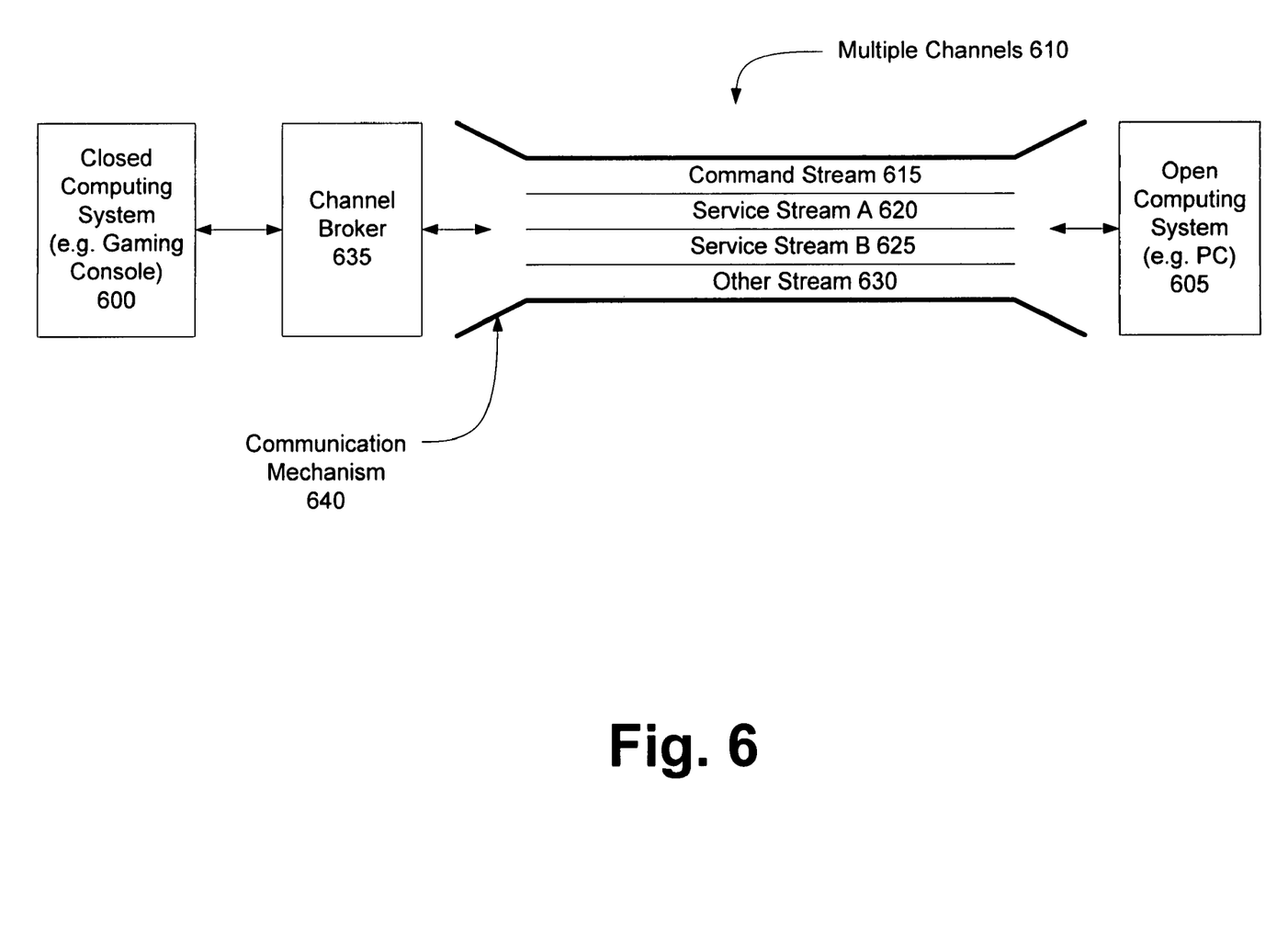
FIG. 6 illustrates that a communication channel may comprise of several streams when a closed device is communicating with (e.g. an open) computing device.

In another aspect of the presently disclosed subject matter, FIG. 6 illustrates that a communication channel between a closed computing system and an open one can have multiple channels for communication. For example, a closed computing system, such as a gaming console 600, can have a channel broker 635 that selects which channel to stream from or receive code and/or data from (in an alternative embodiment, the channel broker 635 can reside on the open computing system 605 or some other third party system, such as a server which is not pictured herein).

Code and/or data sent from the open computing system 605, e.g. a PC, can include a command stream 615, some sort of service stream A 620, or other service stream B 625, or yet some other kind of stream 630. The number of streams is not logically limited to any number, but rather may depend on how many streams or associated channels any given system is willing to, needs to, or wants to multiplex. A plurality of different or related streams may be used to communicate between the two illustrated systems 600, 605. For example, the command stream 615 can be used to send commands (e.g. code) from the open system 605 to the closed system 600. Other streams, such as the service stream A 620, can be used to send data from the open system to the closed system 600.

Thus, in this aspect of the presently disclosed subject matter, any information (which may include code and/or data) sent from the open computing system 605 to the closed computing system 600 may be distributed across a variety of channels in the established communication mechanism 640. The establishing of this communication mechanism 640 may be identified with the telecommunication mechanism discussed above with reference to FIG. 5, or some other kind of equivalent or substitute mechanism. Those of skill in the art will readily appreciate the numerous other communication mechanisms that could be used.

For example, if a developer is coding an unsigned game using the open computing system 605 to run on the closed computing system 600, per the discussion in FIG. 4, information can be provided to the closed system 600 via the communication mechanism 640 either in one transaction, or as part of several related or non-related transactions (e.g. synchronization updates), or it can be streamed in real time as the developer is coding. The communication mechanism 640 can accommodate each of these communication regimes and other communication architectures.

Figure 7:
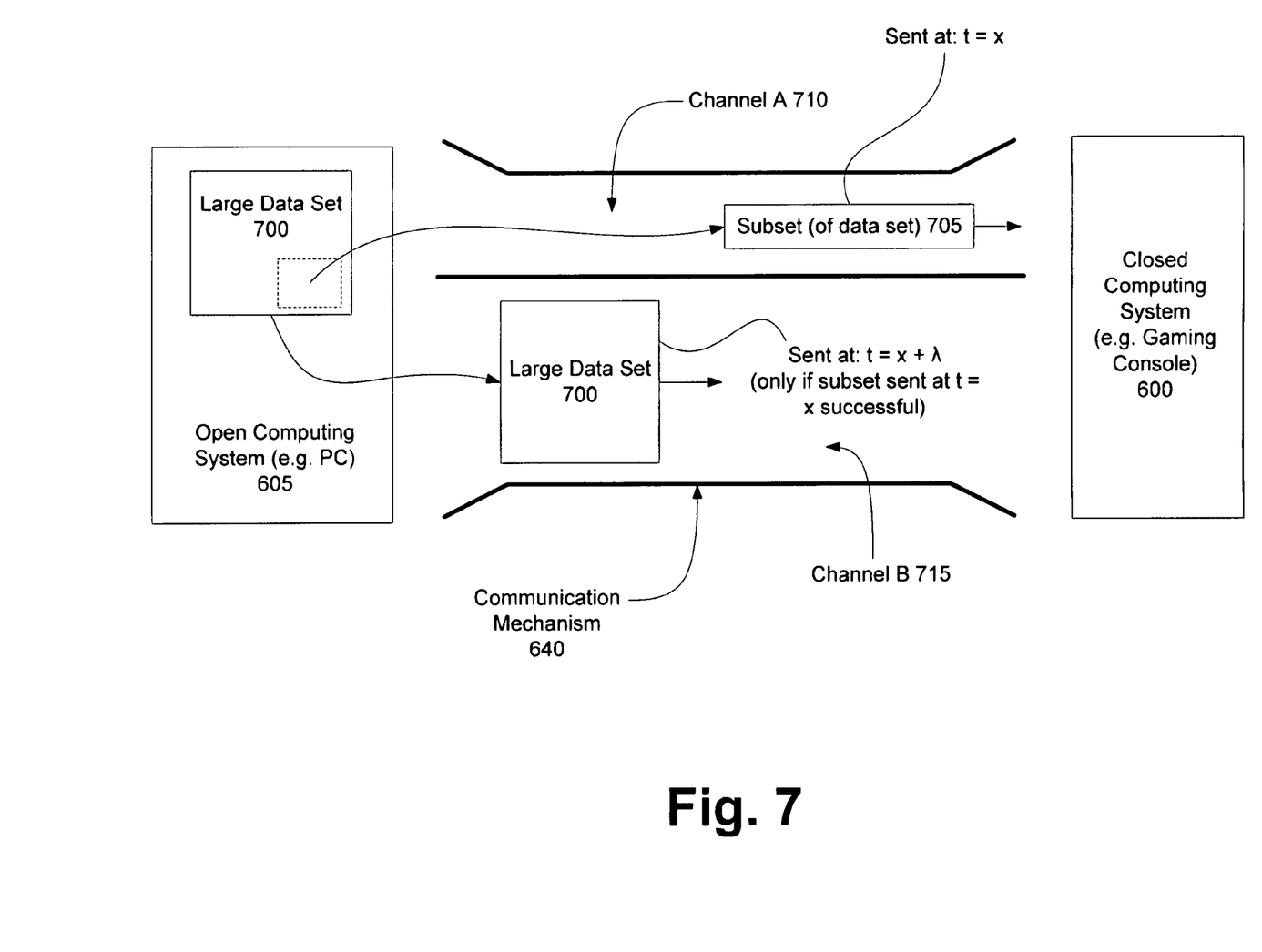
FIG. 7 illustrates that a subset of some data set is first sent to the closed computing device in order to determine whether a larger data set associated with the subset can be processed by closed console resources.

Next, FIG. 7 illustrates that a subset of some data set is first sent to the closed computing device in order to determine whether a larger data set associated with the subset can be processed by closed console resources. Specifically, the open computing system 605 shown in FIG. 6, can have various data stored on it. In one aspect of the presently disclosed subject matter, this can be a large data set 700 (on the order of several megabytes, gigabytes, terabytes, etc.) that also has a smaller subset of data 705. The size of this subset can be implementation dependent, whether several bytes, kilobytes, megabytes, etc. The general notion herein is that the subset 705 is some portion or factor of the larger data set 700. In one embodiment this subset 705 may be representative of the larger data set 700, whereas in other embodiments the subset 705 may be part of the larger data set 700.

Thus, in this aspect of the present disclosure, the subset 705 is sent at some time, t=x. At this time, the subset 705 is sent from the open system 605, where a developer may be creating unsigned content, to the closed system 600. If the closed system 600 deems this subset of data 705 as amendable to run on the system 600, whether because this subset 705 is the type of subset that the closed system 600 is looking for or perhaps the closed system 600 has the resources to handle this subset 705, then the larger data set 700 can also be sent. Various heuristics can be used for making this determination, including GPU processing ability, memory size of the closed console resources, and so on.

As mentioned, the larger data set 700 can be sent at a different or later time, t=x+λ, as is shown in FIG. 7. Moreover, this larger data set 700 can be sent subject to a determination regarding the above discussed subset 705. For example, the closed system 600 can make a determination, based on the subset 705, whether or not to receive the rest of the larger data set 700. If, for instance, the subset 705 is some complicated graphics data (texture mapping, pixel shading, etc.) representative of the rest of the data set 700, then if the closed system 600 makes a determination that it does not currently have enough resources (e.g. GPU processing, memory, etc.) based on examining the subset 705, it may decline receiving the rest of the data set 700. Conversely, it the subset 705 is some straightforward and representative of the data set 700 information, it may accept the data set 700.

FIG. 7 also shows that the subset 705 and the data set 700 may be sent not only a different times but also on different channels of the communication mechanism 640. For example, the subset 705 can be sent on channel A 710, while the data set can be sent on channel B 715. Alternatively, the data set 700 may be spread out over several channels of the communication mechanism 640, whether based on size, the type of content, or the speed with which the data set 700 can be delivered from the open system 605 to the closed system 600. And furthermore, any information sent between the open system 605 and the closed system 600 can be bi-directional in that it may be sent from the open system 605 to the closed system 600 (which includes many of the scenarios discussed above) and from the closed system 600 to the open system 605 (e.g. updates, notifications, or some other information).

Figure 8:
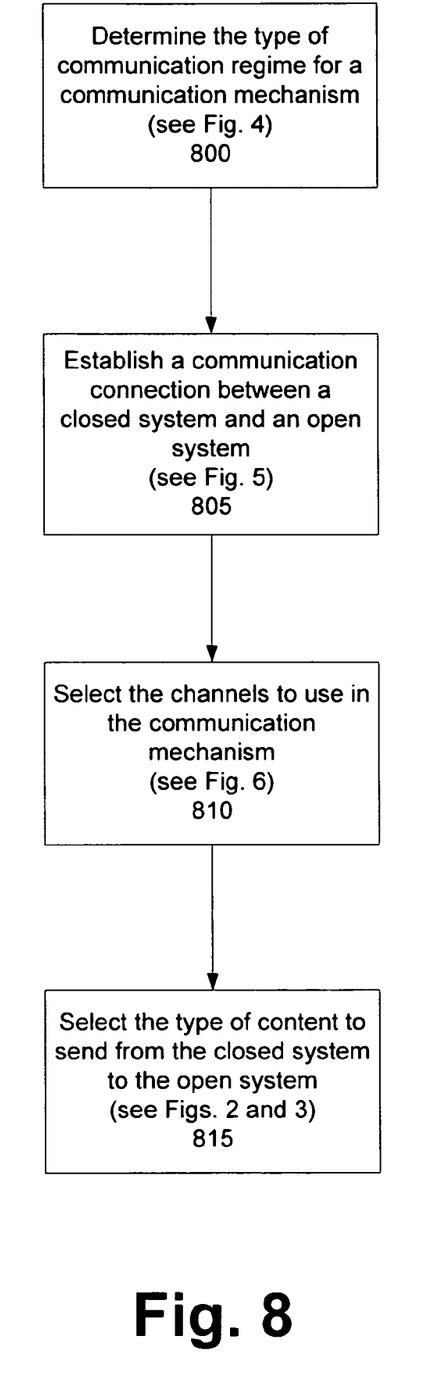
FIG. 8 illustrates a block diagram flow chart for a method of implementing the aspect discussed with reference to FIGS. 4-7.

By way of summary of the subject matter discussed so far, FIG. 8 illustrates in block diagram form the various aspects discussed above with reference to FIGS. 4-7. At block 800, a determination is made regarding the type of communication regime (e.g. one time, synchronized, live streamed) for a communication channel, as was discussed in detail with reference to FIG. 4. Once this determination is made, at block 805, a communication connection can be established between a closed system and an open system, as was discussed in detail with reference to FIG. 5. Then, at block 810, the actual channels may be selected that will be used in the communication between the two systems. It should be noted, as was already mentioned above, that the communication can occur between any closed system and any other system (whether open or closed—the discussion regarding the standard closed and open system scenario is merely exemplary and non-limiting). The various channels that can be used are shown in FIG. 6. Finally, at block 815, the type of content is selected to be sent from the open system to the closed system. In one aspect of the present disclosure, the content may be unsigned gaming content, although other programs and/or applications, whether signed or unsigned, can also be communicated between the closed system and its corresponding system (i.e. the system on the other side of the communication mechanism).

Exemplary Computing Device

Figure 9:
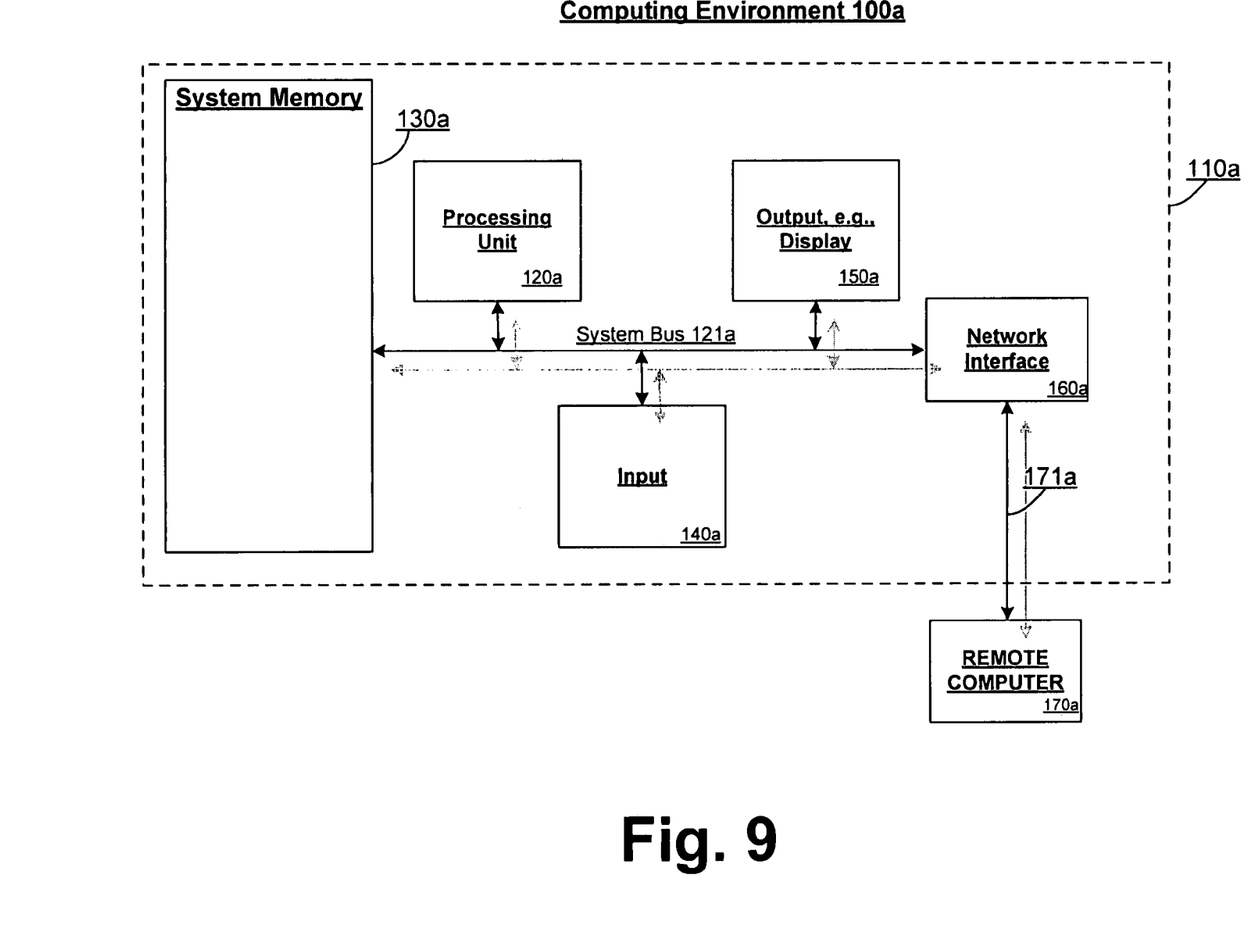
FIG. 9 illustrates a block diagram representing an exemplary non-limiting computing system environment on which signed or unsigned content can execute in accordance with the presently disclosed subject matter, after being transported to the closed computing system from some remote computing system.

As mentioned, the presently disclosed subject matter applies to any device wherein it may be desirable to run unsigned content on an otherwise closed system and where it may be desirable to use the above described communication mechanism in connection with such a closed system. It should be understood, however, as indicated above, that other equivalent content to that of unsigned content can work with presently disclosed computing objects of all kinds. Accordingly, the below general purpose remote computer described below in FIG. 9 is but one example, and the present communications mechanism may interface with any client or portable device, whether standalone or having network/bus interoperability and interaction. Thus, the present subject matter may be implemented in an environment of networked hosted services in which very little or minimal client resources are implicated, e.g., a networked environment in which the client device serves merely as an interface to the network/bus, such as an object placed in an appliance.

Although not required, the present subject matter can be managed using an operating system, for use by a developer of services for a device or object, and/or included within application software that operates in connection with the present subject matter. Software may be described in the general context of computer-executable instructions, such as program modules, being executed by one or more computers, such as client workstations, servers or other devices. Those skilled in the art will appreciate that the present subject matter may be practiced with other computer system configurations and protocols.

FIG. 9 thus illustrates an example of a suitable computing system environment 100a in which the various aspects described with reference to FIGS. 2-8 may be implemented, although as made clear above, the computing system environment 100a is only one example of a suitable computing environment for execution device and is not intended to suggest any limitation as to the scope of use or functionality of these various aspects. Neither should the computing environment 100a be interpreted as having any dependency or requirement relating to any one or combination of components illustrated in the exemplary operating environment 100a.

With reference to FIG. 9, an exemplary remote device for interfacing with the aforementioned aspects includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media. The above discussed communication mechanism can be stored in various such media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

In addition to a user being able to provide input to the closed computing device via controllers, a user may enter commands and information into the computer 110a through input devices such as a keyboard and pointing device, commonly referred to as a mouse, trackball or touch pad. In addition to such peripheral devices, other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a. All these devices can aid users in experiencing the execution of unsigned content that is provided to a closed device via the above discussed transport mechanism.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 9 include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used. Thus, any of these and other means of communication can be the basis for establishing a communication link between closed and other computing system using the communication mechanism of FIGS. 5-8.

Exemplary Multimedia (Closed) Console Environment

Figure 10:
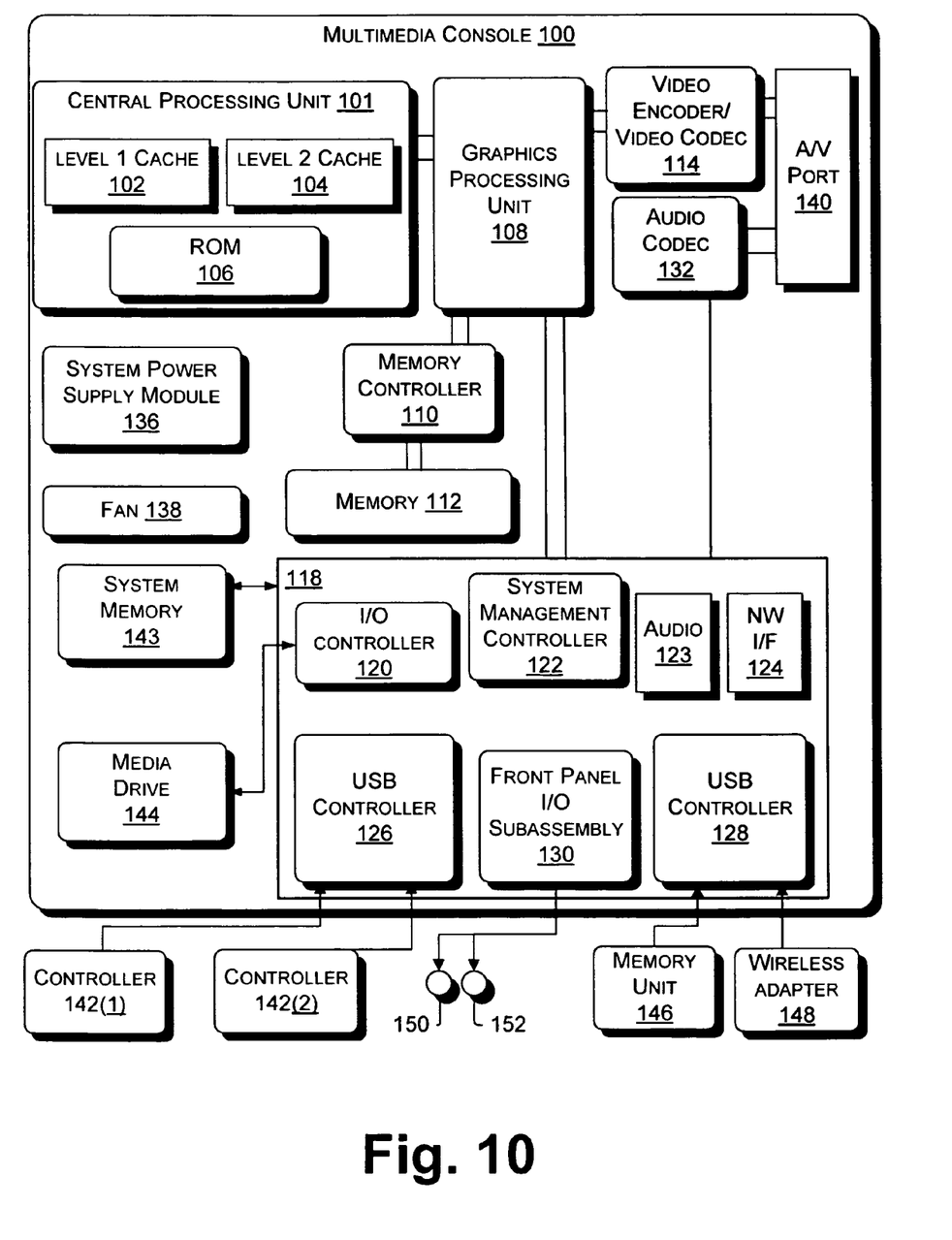
FIG. 10 illustrates a block diagram showing an exemplary non-limiting multimedia console device which may interface with the presently discussed transport or communication mechanism.

Referring next to FIG. 10, shown is a block diagram illustrating another exemplary non-limiting computing device, i.e., an exemplary multimedia console, which may be closed to a limited amount of software components being signed by some signing authority (whether the closed device maker or some gaming publisher). FIG. 10 shows the functional components of a multimedia console 100 in which aspects of the presently disclosed subject matter may be implemented. In other words, the communication mechanism, of FIGS. 4-8 can be implemented on this console side (but it will be appreciated by those of skill in the art that it could also be implemented on the open, PC side).

The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a FLASH memory device (not shown). Further, ROM 106 may be located separate from CPU 101. Any of these resources can aid in the transportation of content between closed and other computing devices.

This Console may have a variety of other resources available to it, such as, a graphics processing unit (GPU) 108 and a video encoder/video codec (coder/decoder) 114 from a video processing pipeline for high speed and high resolution graphics processing. In this setup, data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display, also using the aforementioned communication mechanism. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community.

The multimedia console depicted in FIG. 10 is a typical multimedia console that may be used to execute a multimedia application, such as, for example, a game. Multimedia applications may be enhanced with system features including for example, system settings, voice chat, networked gaming, the capability of interacting with other users over a network, e-mail, a browser application, etc. Such system features enable improved functionality for multimedia console 100, such as, for example, players in different locations can play a common game via the Internet. Thus, the communication mechanism can not only provide unsigned gaming content, but these system features (voice chat, e-mail, etc.).

Also, over time, system features may be updated or added to a multimedia application via the said communication mechanism. Rather than requiring the multimedia developer to make significant modifications to the multimedia application to provide these system features, the systems and methods described herein allow a multimedia developer to provide system features through separate system applications that work in conjunction with the multimedia application. For example, a system application may embody functionality related to networked capabilities, thereby enabling a multimedia application to be readily adapted to provide networked capabilities with little work by the multimedia (e.g., game) developer. One such capability is that of system level notifications for multiple and networked users. Making system level notifications part of a system application as opposed to being handled by individual multimedia applications, such as games running on the system, takes handling displaying notifications such as game invitations out of the development process for multimedia application developers and allows them to focus on the multimedia application itself.

As mentioned above, while exemplary embodiments of the present subject matter have been described in connection with various computing devices and network architectures, the underlying concepts may be applied to any computing device, system, or communication mechanism in which an input device may be utilized to control the device or system (whether locally or remotely). For instance, the algorithm(s) and hardware implementations of the discussed aspects may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting.

As mentioned, the various techniques described herein may be implemented in connection with hardware or software or, where appropriate, with a combination of both. Thus, the methods and apparatus of the present subject matter, or certain aspects or portions thereof, may take the form of program code (i.e., instructions) embodied in tangible media, such as floppy diskettes. CD-ROMs, hard drives, or any other machine-readable storage medium, wherein, when the program code is loaded into and executed by a machine, such as a computer, the machine becomes an apparatus for practicing the presently disclosed aspects. In the case of program code execution on programmable computers, the computing device generally includes a processor, a storage medium readable by the processor (including volatile and non-volatile memory and/or storage elements), at least one input device, and at least one output device. One or more programs that may implement or utilize any software provided in accordance with the these aspects are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the presently disclosed aspects may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the presently disclosed subject matter. When implemented on a general-purpose processor, the program code combines with the processor to provide a unique apparatus that operates to invoke the functionality of the present subject matter. Additionally, any storage techniques used in connection with the present aspects may invariably be a combination of hardware and software.

While the aspects described above have been described in connection with the preferred embodiments of the various figures, it is to be understood that other similar embodiments may be used or modifications and additions may be made to the described embodiment for performing the same function without deviating therefrom. For example, one skilled in the art will recognize that the methods, as described in the present application may apply to any computing device or environment, such as a gaming console, handheld computer, portable computer, etc., whether wired or wireless, and may be applied to any number of such computing devices connected via a communications network, and interacting across the network via the mentioned communication mechanism.

Furthermore, it should be emphasized that a variety of computer platforms, including handheld device operating systems and other application specific operating systems are contemplated herein as interfacing with the communication mechanism, especially as the number of wireless networked devices continues to proliferate. Still further, functionality of the present subject matter may be implemented in or across a plurality of processing chips or devices, and storage may similarly be effected across a plurality of devices. Therefore, the presently discussed aspects should not be limited to any single embodiment, but rather should be construed in breadth and scope in accordance with the appended claims.

SUMMARY

In short, various methods, system, and computer readable can embody the various aspects discussed above. As was mentioned above with regard to other figures, such as FIG. 8, unsigned software content components (e.g. user or developer made games) can be provided to the closed computing device via a connection mechanism from a computing device (or alternatively, in the nominal case, via a DVD or some other optical, magnetic or equivalent device). Furthermore, such providing can be accomplished dynamically via a communication from a computing device (whether a PC, a server, or other gaming console) or, alternatively, it can be accomplished by streaming unsigned content from such a computing device. This Summary, of course, is not limiting but merely exemplary. It is apparent that other aspects not discussed herein but discussed above, such security measures to ensure encrypted communications using unique identifiers and public/private key encryption, are also contemplated herein albeit not explicitly mentioned in this Summary.

The invention claimed is:

1. A method for transferring content among computing systems and closed computing systems, comprising:
   establishing a communication session between a closed computing device and a first computing device;
   selecting by the first computing device at least one channel to use within said communication session; and
   sending from the first computing device unsigned content in said at least one channel, wherein said unsigned content includes a subset of a set of information sent at a first time, and wherein said unsigned content includes said set of information sent at a second time if a determination made based on said subset and resources of said closed system concludes that said set should be sent to said closed computing device.

2. The method according to claim 1, wherein said communication session is established with a one time password initialization and transfer performed at said closed computing device, a one time negotiation and request between said closed computing device and said first computing device, an authentication request and response between said closed computing device and said first computing device, a connection request and validation between said closed computing device and said first computing device, and a transfer request between said closed computing device and said first computing device.

3. The method according to claim 1, wherein said sending of unsigned content includes one of encoding said unsigned content and decoding said unsigned content.

4. The method according to claim 1, wherein said selecting at least one channel includes selecting a first channel for sending said subset of information and a second channel for sending said set of information, wherein said second channel includes at least one channel from a set of channels.

5. The method according to claim 1, wherein said sending is performed using one of (a) a one-time transaction, (b) a synchronization transaction, and (c) a streaming transaction.

6. The method according to claim 1, wherein said sending of unsigned content is bi-directional, including sending said unsigned content from said first computing device to said closed device and from said closed computing device to said first computing device.

7. The method according to claim 1, wherein said first computing device is one of an open computing device and a closed computing device.

8. A system for transferring content among computing systems and closed computing systems, comprising:
   a communication mechanism for establishing a communication session between a closed computing device and a first computing device;
   a channel broker for selecting at least one channel to use within said communication session; and
   a closed computing system including said computing device, wherein said closed system sends unsigned content in said at least one channel, wherein said unsigned content includes a subset of a set of information sent at a first time, and wherein said unsigned content includes said set of information sent at a second time if a determination made based on said subset and resources of said closed system concludes that said set should be sent to said closed computing device.

9. The system according to claim 8, wherein said communication mechanism establishes said communication session with a one time password initialization and transfer performed at said closed computing device, a one time negotiation and request between said closed computing device and said first computing device, an authentication request and response between said closed computing device and said first computing device, a connection request and validation between said closed computing device and said first computing device, and a transfer request between said closed computing device and said first computing device.

10. The system according to claim 8, wherein said closed system sends unsigned content and includes one of encoding said unsigned content and decoding said unsigned content.

11. The system according to claim 8, wherein said channel broker selects at least one channel includes selecting a first channel for sending said subset of information and a second channel for sending said set of information, wherein said second channel includes at least one channel from a set of channels.

12. The system according to claim 8, wherein said closed system sending is performed using one of (a) a one-time transaction, (b) a synchronization transaction, and (c) a streaming transaction.

13. The system according to claim 8, wherein said closed system sending of unsigned content is bi-directional, including sending said unsigned content from said first computing device to said closed device and from said closed computing device to said first computing device.

14. The system according to claim 8, wherein said first computing device is one of an open computing device and a closed computing device.

15. A computer readable storage medium bearing computer executable instructions for transferring content among computing systems and closed computing systems, comprising:
   a first instruction for establishing a communication session between a closed computing device and a first computing device;
   a second instruction for selecting at least one channel to use within said communication session; and
   a third instruction for sending unsigned content in said at least one channel, wherein said unsigned content includes a subset of a set of information sent at a first time, and wherein said unsigned content includes said set of information sent at a second time if a determination made based on said subset and resources of said closed system concludes that said set should be sent to said closed computing device.

16. The computer readable storage medium according to claim 15, wherein said first instruction is established with a one time password initialization and transfer performed at said closed computing device, a one time negotiation and request between said closed computing device and said first computing device, an authentication request and response between said closed computing device and said first computing device, a connection request and validation between said closed computing device and said first computing device, and a transfer request between said closed computing device and said first computing device.

17. The computer readable storage medium according to claim 15, wherein said third instruction includes sending of unsigned content and one of encoding said unsigned content and decoding said unsigned content.

18. The computer readable storage medium according to claim 15, wherein said second instruction includes selecting a first channel for sending said subset of information and a second channel for sending said set of information, wherein said second channel includes at least one channel from a set of channels.

19. The computer readable storage medium according to claim 15, wherein said third instruction is performed using one of (a) a one-time transaction, (b) a synchronization transaction, and (c) a streaming transaction.

20. The computer readable storage medium according to claim 15, wherein said third instruction includes sending of unsigned content in a bi-directional manner, including sending said unsigned content from said first computing device to said closed device and from said closed computing device to said first computing device.

* * * * *